(12) United States Patent
Klode

(10) Patent No.: US 7,463,022 B2
(45) Date of Patent: Dec. 9, 2008

(54) POSITION SENSOR SYSTEM WITH MAGNETICALLY ANISOTROPIC FLUX GUIDE

(75) Inventor: Harald Klode, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 124 days.

(21) Appl. No.: 11/503,644

(22) Filed: Aug. 14, 2006

(65) Prior Publication Data

US 2008/0036451 A1 Feb. 14, 2008

(51) Int. Cl.
*G01B 7/30* (2006.01)
*G01R 33/07* (2006.01)

(52) U.S. Cl. .............................. 324/207.25; 324/207.2; 324/251

(58) Field of Classification Search .............. 324/207.2, 324/207.25, 251, 174; 73/514.31, 514.39, 73/514.16; 338/32 R, 32 H
See application file for complete search history.

(56) References Cited

U.S. PATENT DOCUMENTS

| 5,861,745 A * | 1/1999 | Herden ..................... 324/207.2 |
| 6,703,827 B1 * | 3/2004 | Wolf et al. ............. 324/207.12 |
| 2001/0009366 A1 * | 7/2001 | Kono et al. ............... 324/207.2 |
| 2003/0155909 A1 * | 8/2003 | Steinruecken et al. .... 324/207.2 |
| 2005/0134258 A1 * | 6/2005 | Kogure et al. .......... 324/207.25 |

* cited by examiner

*Primary Examiner*—Bot LeDynh
(74) *Attorney, Agent, or Firm*—Thomas N. Twomey

(57) ABSTRACT

A position sensor system including a magnet, a magnetic flux sensor positioned a distance away from the magnet, the magnetic flux sensor and the magnet defining a flux path therebetween, and a flux guide positioned in the flux path to guide magnetic flux to the magnetic flux sensor.

18 Claims, 9 Drawing Sheets

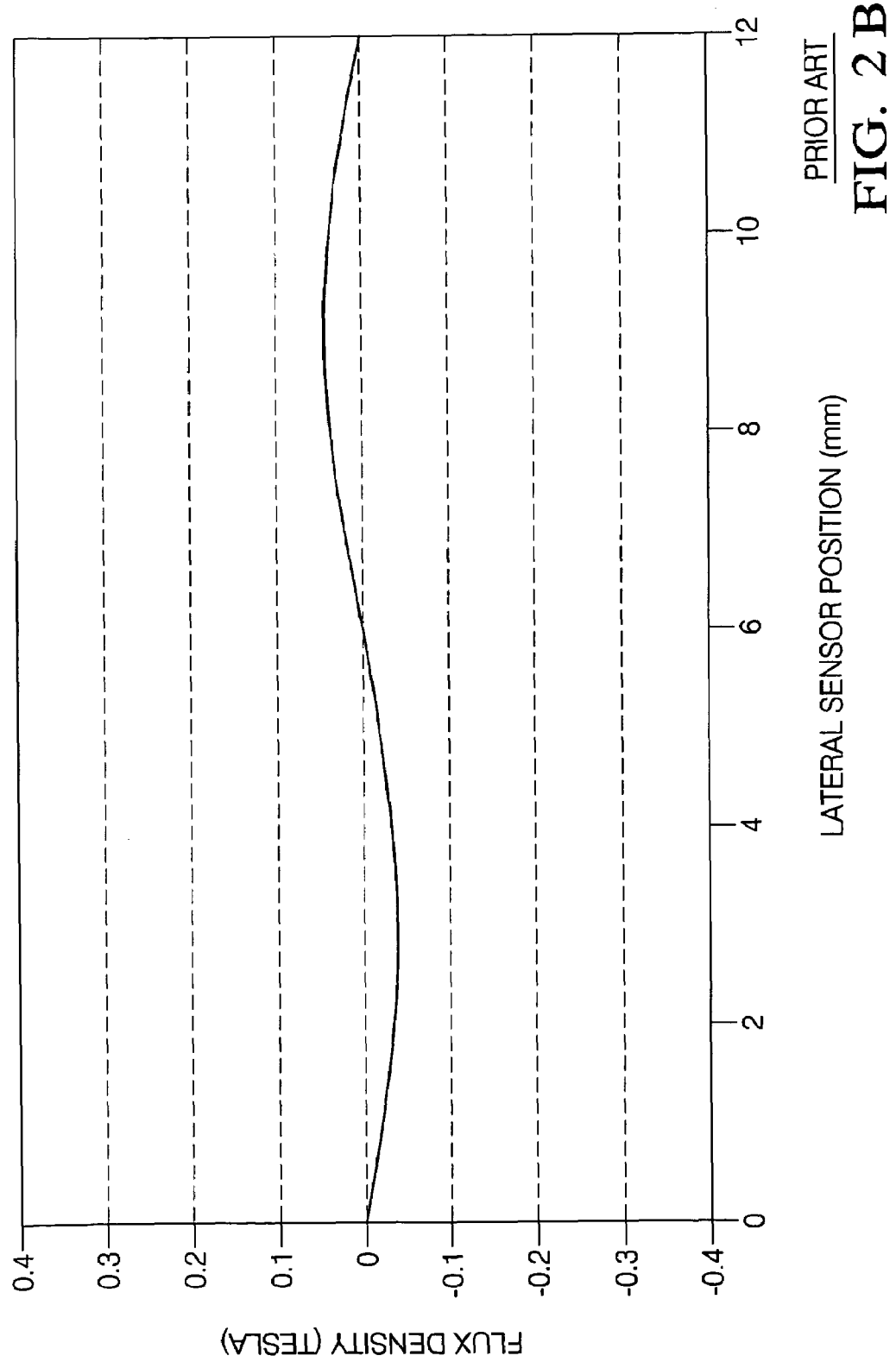

POSITION SENSOR SYSTEM WITH MAGNETICALLY ANISOTROPIC FLUX GUIDE

BACKGROUND

The present application relates to position sensor systems and, more particularly, to position sensor systems including at least one magnetically anisotropic flux guide.

Position sensor systems have been used to monitor the position of rotating motor shafts. A traditional position sensor system, generally designated 10 in FIG. 1A, typically includes a motor shaft 12, permanent magnets 14, 16 and an array of Hall effect sensors 18, 20, 22. The magnets 14, 16 are secured to the motor shaft 12 such that the magnets 14, 16 have alternating polarities. For example, magnet 14 may have a north polarity and magnet 16 may have an opposite, south polarity.

The array of Hall effect sensors 18, 20, 22 is positioned in close proximity to the magnets 14, 16 to maximize the magnetic flux density at the sensors 18, 20, 22. As shown in FIG. 1A, the sensors 18, 20, 22 are positioned about 1.2 mm from the magnets 14, 16, thereby providing the flux density versus lateral sensor position profile shown in FIG. 1B.

Thus, as the motor shaft 12 rotates about its axis, the sensors 18, 20, 22 provide binary output signals depending upon the polarity of the magnetic field they are facing. For example, a north polarity may generate a first logical output (e.g., logic hi) and a south polarity may generate a second logical output (e.g., logic low).

Oftentimes it is desirable to space the sensors 18', 20', 22' a greater distance away from the magnets 14', 16', as shown by the system 10' illustrated in FIG. 2A. For example, a user may wish to increase the spacing between the sensors 18', 20', 22' and the magnets 14', 16' to avoid damage to the sensors by heat generated by the motor or to use various packaging and mounting schemes, such as surface-mounted Hall elements or to sense through walls.

However, the magnetic flux density decreases rapidly as the sensors 18', 20', 22' move away from the magnets 14', 16'. For example, sensors 18', 20', 22' are positioned about 6.0 mm from the magnets 14', 16', thereby providing the flux density versus lateral sensor position profile shown in FIG. 2B. However, this shown flux density profile may not have a sufficiently high magnitude, therefore failing to trigger the Hall effect devices in a manner that is suitable for generating the desired hi-lo binary output of the Hall sensor.

Accordingly, there is a need for a position sensor system capable of achieving greater magnetic flux densities at increased sensor-magnet spacings.

SUMMARY

In one aspect, the disclosed position sensor system includes a magnet, a magnetic flux sensor positioned a distance away from the magnet, the magnetic flux sensor and the magnet defining a flux path therebetween, and a flux guide positioned in the flux path to guide magnetic flux to the magnetic flux sensor In another aspect, the disclosed position sensor system includes a magnet, a Hall effect sensor positioned a distance away from the magnet and a flux guide positioned at least partially between the magnet and the Hall effect sensor.

In another aspect, the disclosed position sensor system includes a shaft defining a rotation axis, a plurality of magnets connected to the shaft and coaxially arranged about the rotation axis, each of the plurality of magnets having an opposite polarity than adjacent ones of the plurality of magnets, at least one Hall effect sensor positioned a distance away from the plurality of magnets and a flux guide positioned in a flux path between the plurality of magnets and the Hall effect sensor, wherein the flux guide includes at least three alternating layers of a ferro-magnetic material and a non-magnetic material.

Other aspects of the disclosed position sensor system will become apparent from the following description, the accompanying drawings and the appended claims.

BRIEF DESCRIPTION OF THE DRAWINGS

FIG. 2B is a graphical illustration of flux density versus lateral sensor position of the system of FIG. 2A;

DETAILED DESCRIPTION

Figure 3:
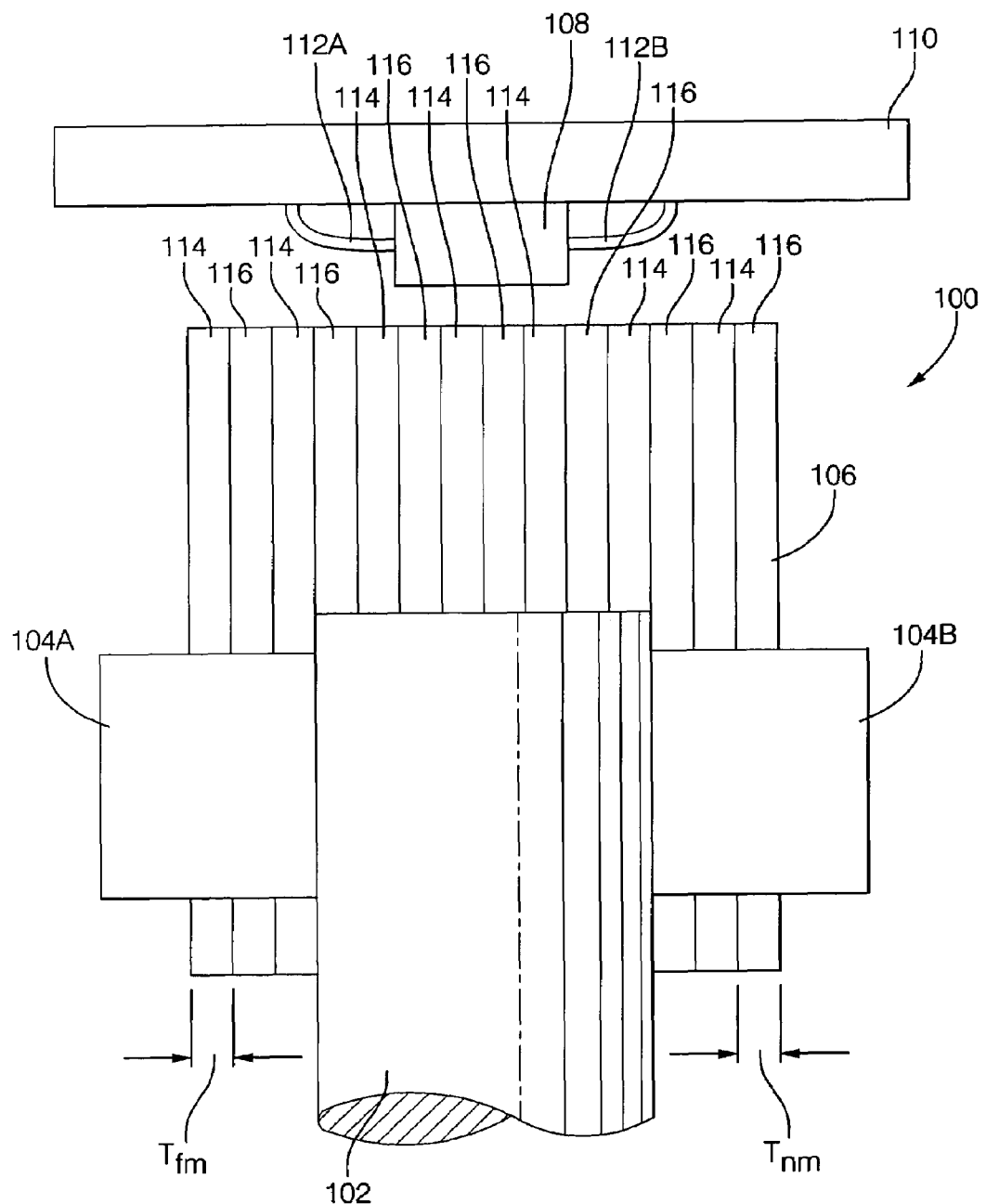
FIG. 3 is a front elevational view, partially in section, of one aspect of the disclosed position sensor system including a magnetically anisotropic flux guide.
Figure 4:
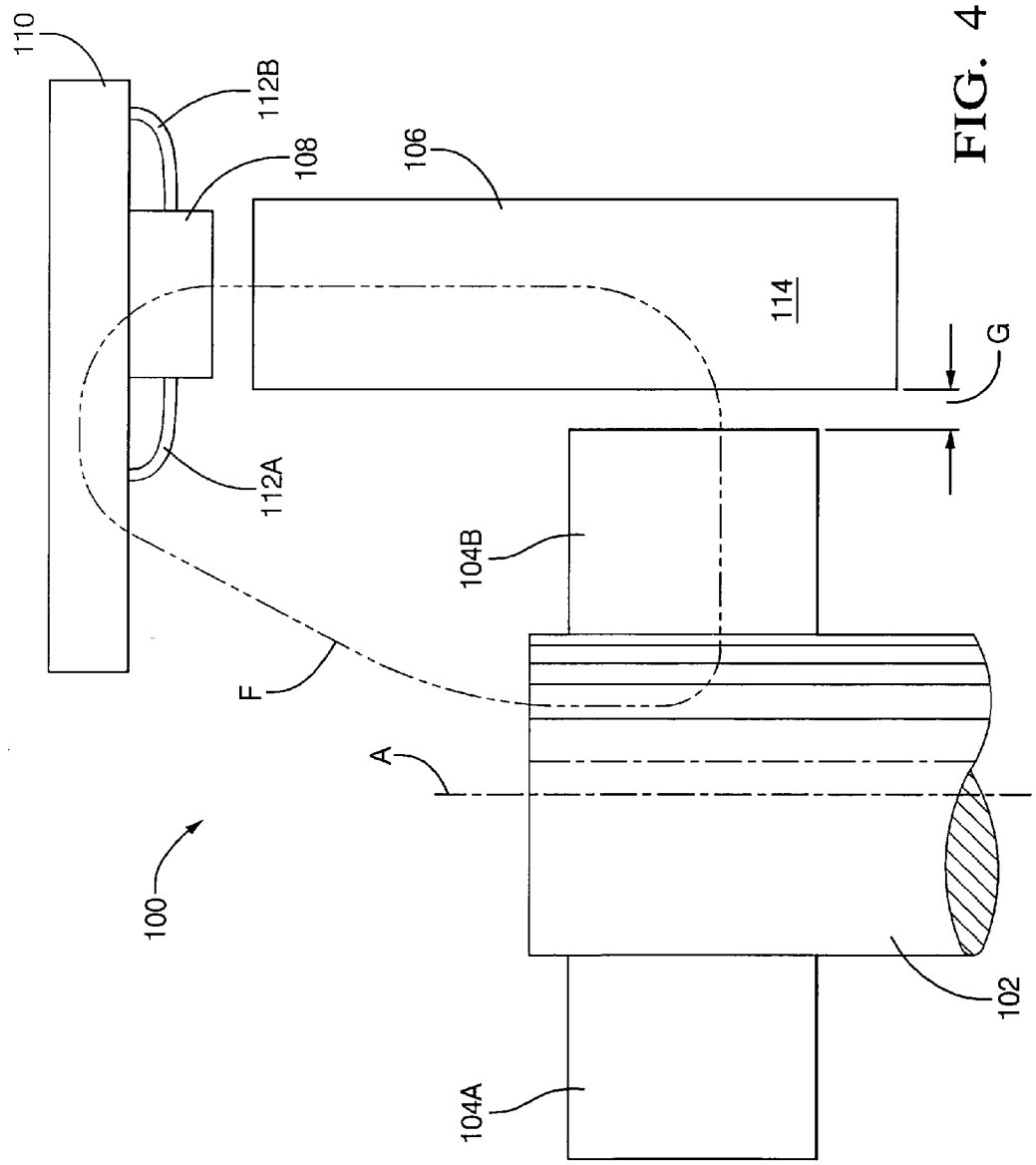
FIG. 4 is a side elevational view, partially in section, of the position sensor system of FIG. 3.

As shown in FIGS. 3 and 4, one aspect of the disclosed position sensor system, generally designated 100, may include a shaft 102, magnets 104A, 104B, a flux guide 106 and a magnetic flux sensor 108, such as a Hall effect sensor. The sensor 108 may be a surface-mounted Hall effect sensor and may be mounted to a circuit board 110 or other surface or mounting assembly (not shown), or may otherwise be spaced from the magnets 104A, 104B. Signals from the sensor 108 may be communicated to a control unit or other processor by way of communication lines 112A, 112B.

The shaft 102 may be a motor shaft extending from a motor (not shown), such as a brushless motor or the like, or may be any rotating shaft. The magnets 104A, 104B may extend coaxially about the periphery of the shaft 102 and may have alternating polarities. Those skilled in the art will appreciate that various numbers and arrangements of magnets 104A, 104B on the shaft 102 may be used according to the disclosed position sensor system 100.

Referring to FIG. 3, the flux guide 106 may be a layered structure formed by alternating layers of a ferro-magnetic material 114 and a non-magnetic separator 116. The ferro-magnetic material 114 may be formed from or may include steel (e.g., steel strips), iron or any other ferro-magnetic material or combinations thereof. The non-magnetic separator 116 may be formed from or may include air or any other non-magnetic material or combinations thereof.

The thickness of each layer 114, 116 of the flux guide 106 may be selected to facilitate guiding magnetic flux to the sensor 108. Those skilled in the art will appreciate that each layer 114, 116 may have a uniform thickness or, alternatively, a different thickness. In one aspect, the thickness $T_{fm}$ of the ferro-magnetic layers 114 may be about 0.1 mm to about 0.5 mm and the thickness of the $T_{nm}$ of the non-magnetic layers 116 may be about 0.1 mm to about 0.5 mm. In another aspect, the thickness $T_{fm}$ of the ferro-magnetic layers 114 may be about 0.5 mm to about 2.0 mm and the thickness of the $T_{nm}$ of the non-magnetic layers 116 may be about 0.5 mm to about 2.0 mm.

For example, a flux guide 106 may be formed by alternating layers of steel strips and polystyrene foam strips, wherein the steel and polystyrene foam strips may be about 10.0 mm wide by about 20.0 mm long and may have a thickness of about 0.5 mm. Alternatively, a flux guide 106 may be formed by assembling a layered structure, wherein steel strips are separated by non-magnetic spacers such that ambient air forms the non-magnetic layers 116.

Referring to FIG. 4, the flux guide 106 may be positioned in the flux path F between the magnets 104A, 104B and the sensor 108 such that the layers 114, 116 of the flux guide 106 are generally parallel with and generally radially aligned with the rotational axis A of the shaft 102. A radial gap G may be provided between the flux guide 106 and the magnets 104A, 104B, wherein the gap G may, for example, have a length of about 0.5 mm to about 1.0 mm.

Thus, the flux guide 106 may guide the magnetic flux F of the magnets 104A, 104B to the sensor 108, thereby increasing the density of the magnetic flux at the sensor.

Figure 5:
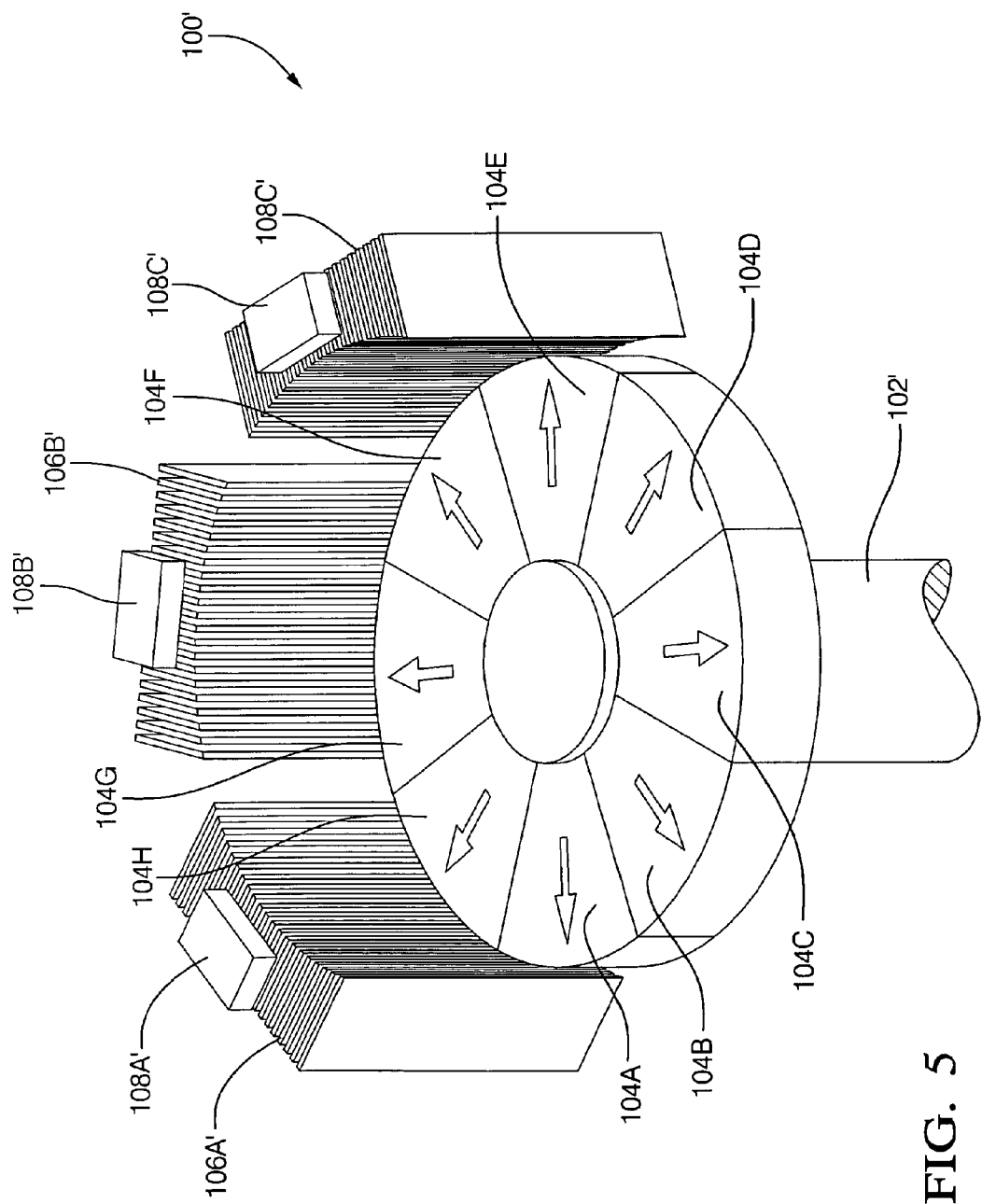
FIG. 5 is a front perspective view of a second aspect of the disclosed position sensor system.
Figure 6A:
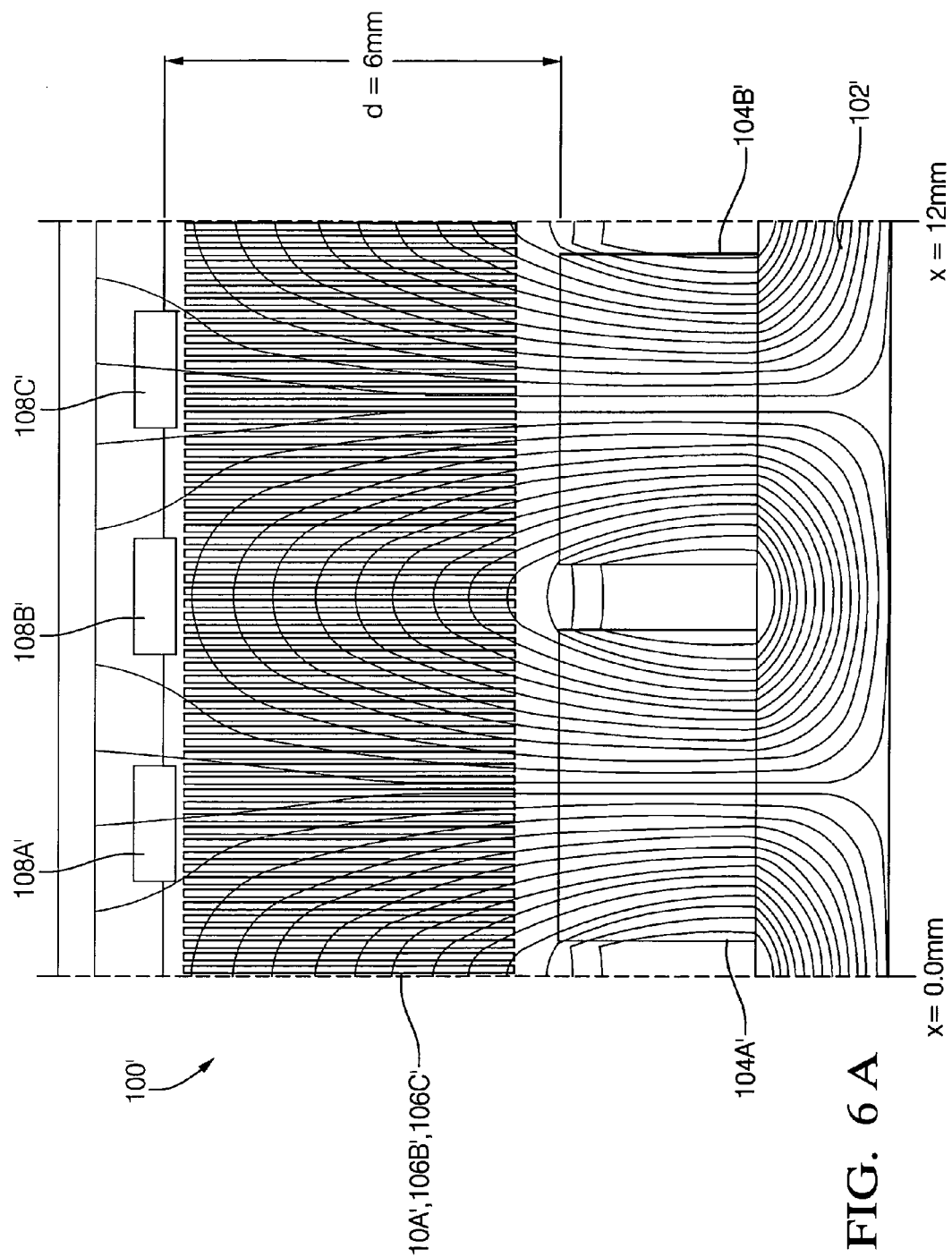
FIG. 6A is a schematic illustration of the position sensor system of FIG. 5 including magnetic flux lines.

Referring to FIGS. 5 and 6A, one alternative aspect of the disclosed position sensor system, generally designated 100', may include a shaft 102', magnets 104A', 104B', 104C', 104D', 104E', 104F', 104G', 104H', flux guides 106A', 106B', 106C' and an array of magnetic flux sensors 108A', 108B', 108C' (e.g., Hall effect sensors). The flux guides 106A', 106B', 106C' may be positioned in the flux paths (FIG. 6A) between the magnets 104A', 104B', 104C', 104D', 104E', 104F', 104G', 104H' and the sensors 108A', 108B', 108C', which may be vertically displaced by about 6.0 mm, thereby providing the flux density versus lateral sensor position profile shown in FIG. 6B.

Figure 1A:
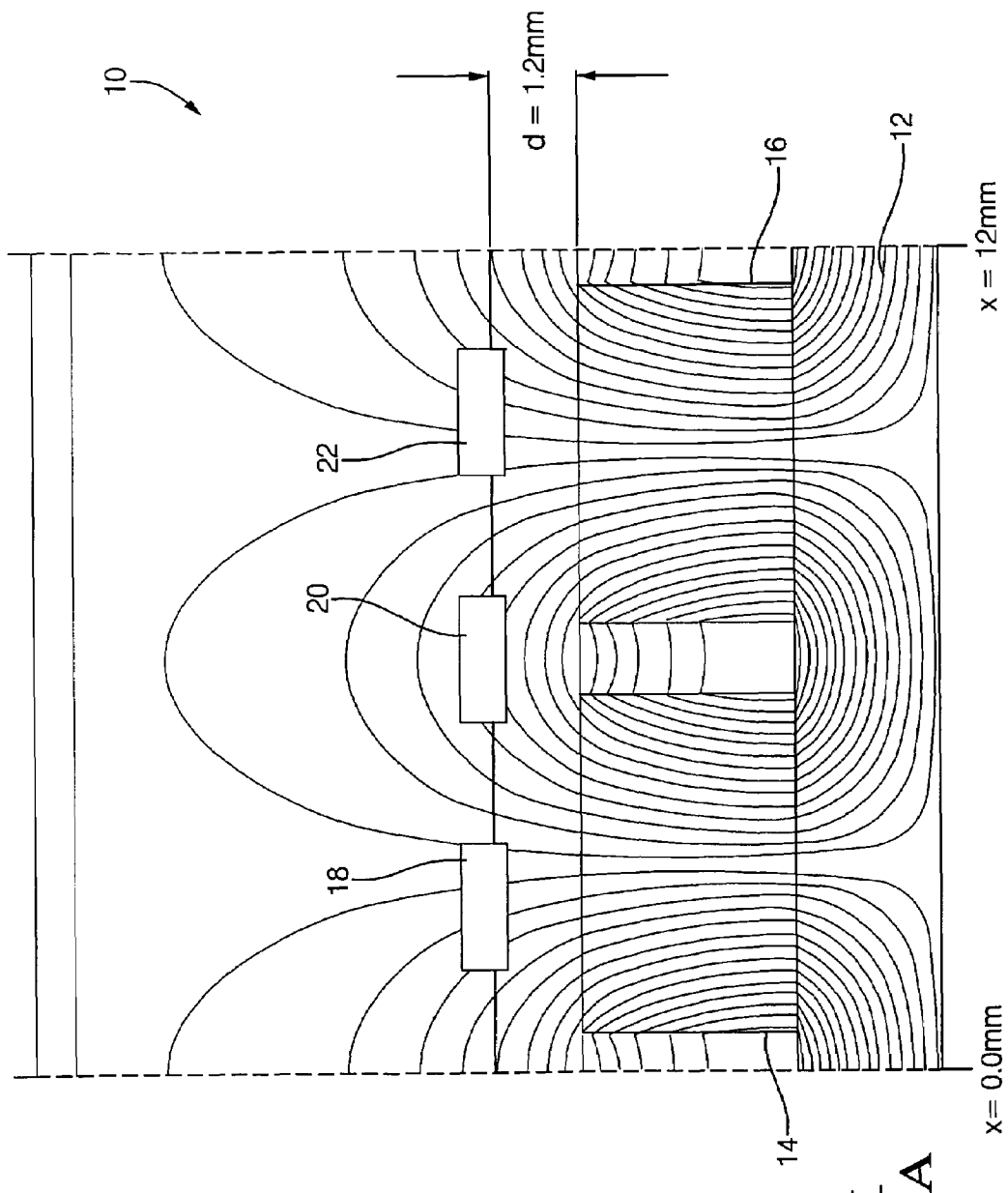
FIG. 1A is a schematic illustration of a prior art position sensor system including magnetic flux lines.
Figure 1B:
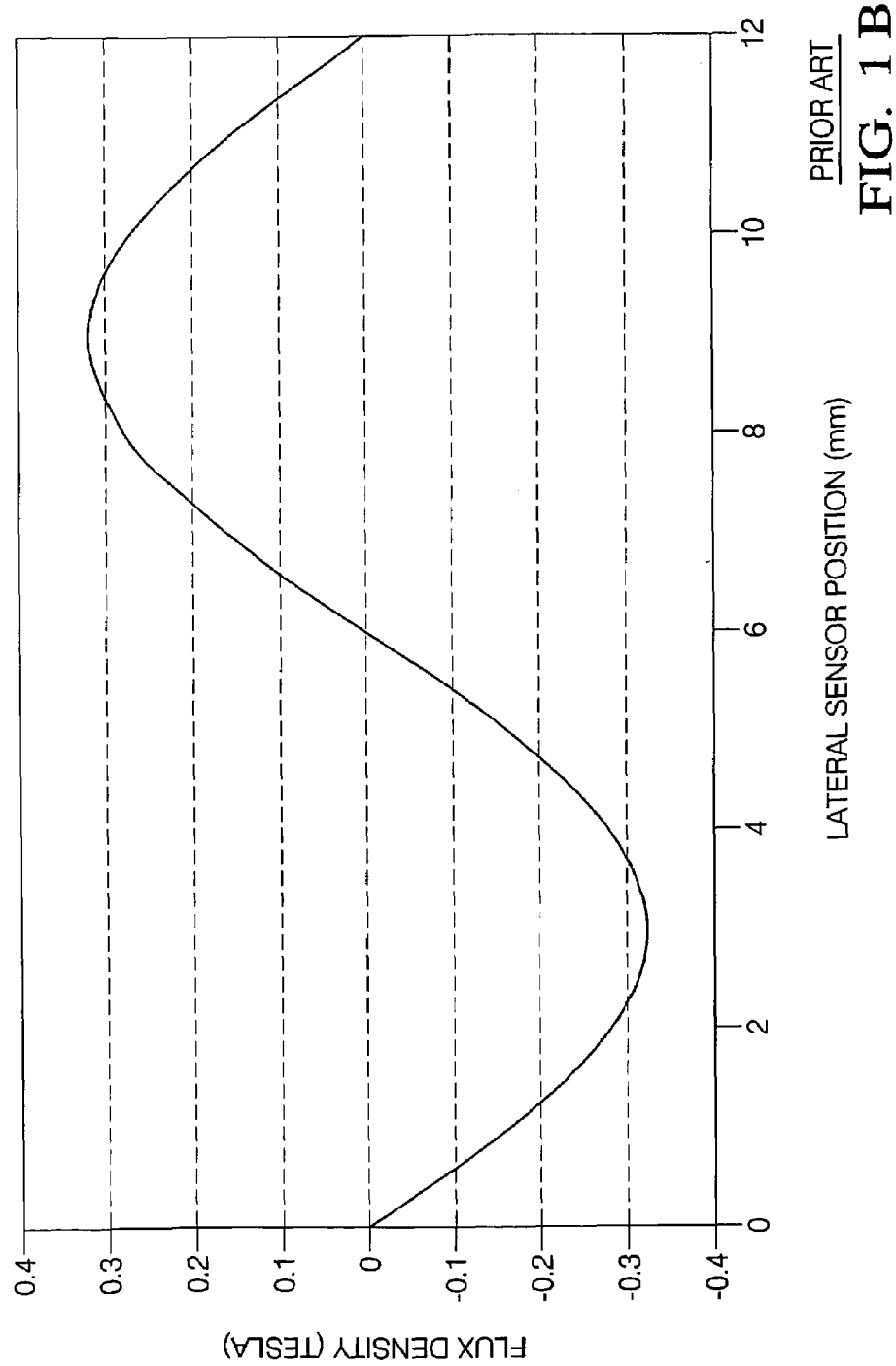
FIG. 1B is a graphical illustration of flux density versus lateral sensor position of the system of FIG. 1A.
Figure 2A:
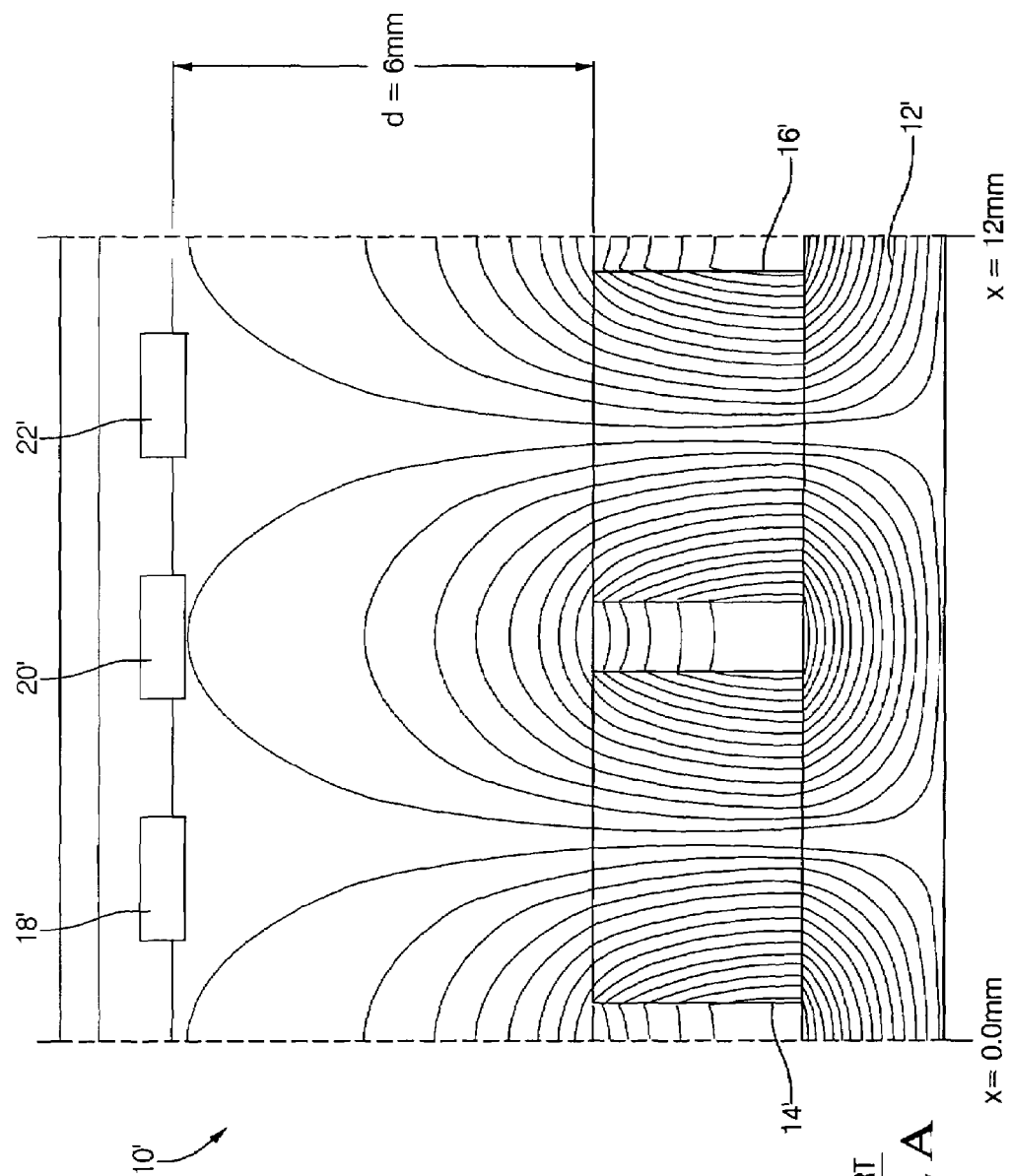
FIG. 2A is a schematic illustration of the prior art position sensor system of FIG. 1A, wherein the spacing between the sensors and magnets was increased.
Figure 6B:
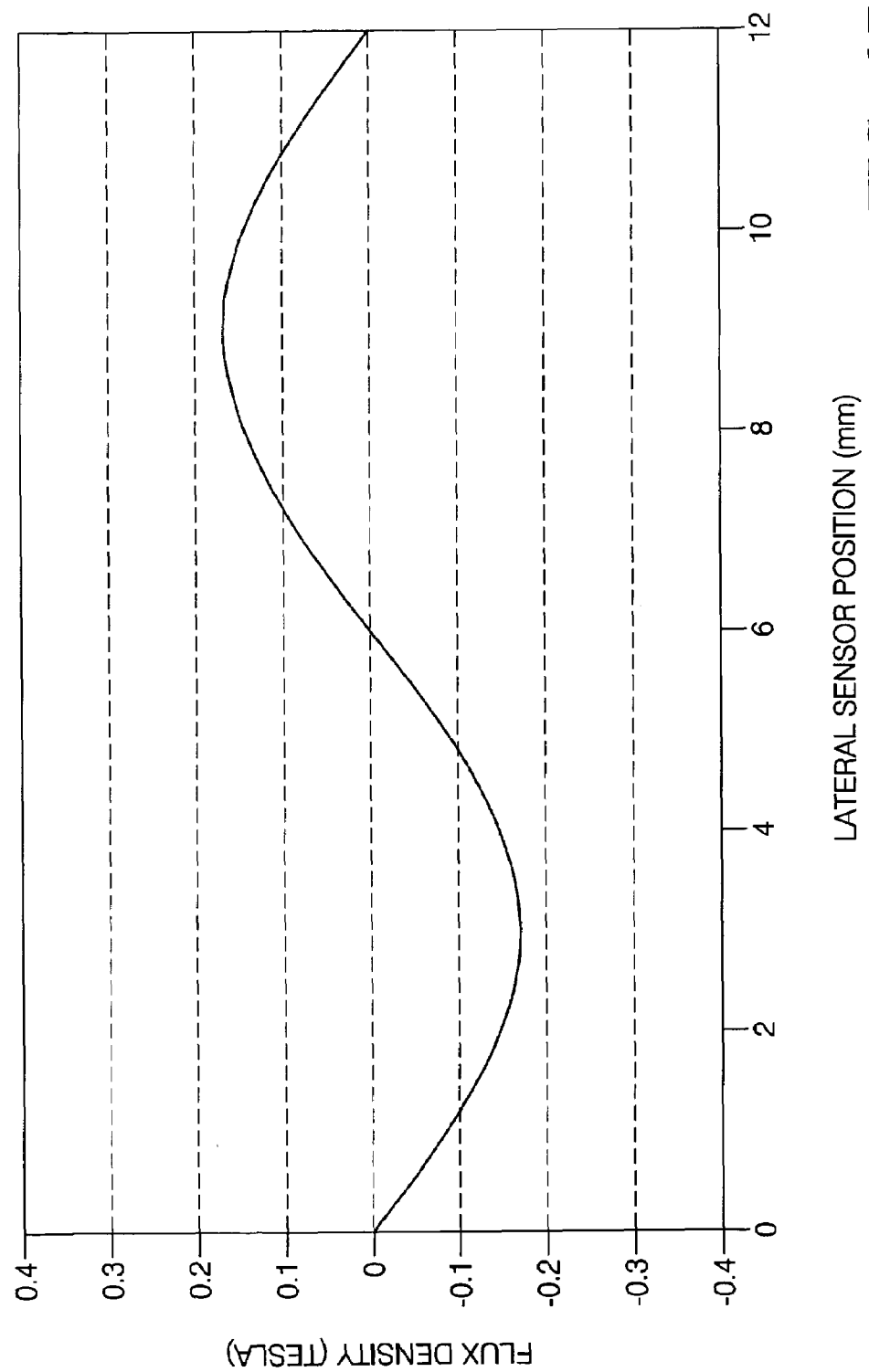
FIG. 6B is a graphical illustration of flux density versus lateral sensor position of the system of FIG. 6A.

Upon comparing FIG. 6B with FIG. 2B, both of which represent a 6.0 mm sensor-magnet spacing, one skilled in the art will appreciate the improved magnetic flux density achieved by using flux guides 106A', 106B', 106C' according to an aspect of the disclosed position sensor system.

Accordingly, those skilled in the art will appreciate that the disclosed position sensor system may facilitate mounting Hall effect sensors at various locations spaced away from the magnets without the traditional deterioration in position signal performance. Therefore, the disclosed position sensor system may reduce assembly and manufacturing costs by eliminating the need for mounting sensors in very close proximity to the magnets.

Although various aspects of the disclosed position sensor system have been shown and described, modifications may occur to those skilled in the art upon reading the specification. The present application includes such modifications and is limited only by the scope of the claims.

What is claimed is:

1. A position sensor system comprising:
   a magnet;
   a magnetic flux sensor positioned a distance away from said magnet, said magnetic flux sensor and said magnet defining a flux path therebetween; and
   a flux guide positioned in said flux path to guide magnetic flux to said magnetic flux sensor, said flux guide being a layered structure having a plurality of ferro-magnetic layers formed from a ferro-magnetic material and a plurality of non-magnetic separating layers formed from a non-magnetic material, said non-magnetic separating layers of said plurality of non-magnetic separating layers being positioned between adjacent layers of said plurality of ferro-magnetic layers.

2. The system of claim 1 wherein said magnet is a permanent magnet.

3. The system of claim 1 wherein said magnet is mounted to a rotatable shaft.

4. The system of claim 3 further comprising a second magnet mounted to said rotatable shaft, said second magnet having an opposite polarity than said magnet.

5. The system of claim 1 wherein said magnetic flux sensor is a Hall effect sensor.

6. The system of claim 1 wherein said distance is at least about 2 millimeters.

7. The system of claim 1 wherein said ferro-magnetic material is steel.

8. The system of claim 1 wherein said non-magnetic material is air.

9. A position sensor system comprising:
   a rotatable shaft;
   a first magnet connected to said shaft;
   a second magnet connected to said shaft, said second magnet having a opposite polarity than said first magnet;
   a Hall effect sensor positioned a distance away from said first and second magnets; and
   a flux guide positioned at least partially between said first and second magnets and said Hall effect sensor, said flux guide being a layered structure having a plurality of planar and parallel layers.

10. The system of claim 9 wherein said first and second magnets are permanent magnets.

11. The system of claim 9 wherein said distance is at least about 2 millimeters.

12. The system of claim 9 wherein said flux guide includes at least two layers of a ferro-magnetic material separated by a layer of non-magnetic material.

13. The system of claim 12 wherein said ferro-magnetic material is steel.

14. The system of claim 12 wherein said non-magnetic material is air.

15. The system of claim 9 wherein said flux guide includes at least three alternating layers of a ferro-magnetic material and a non-magnetic material.

16. A position sensor system comprising:
   a shaft defining a rotation axis;
   a plurality of magnets circumferentially connected to said shaft, each of said plurality of magnets having an opposite polarity than adjacent ones of said plurality of magnets;
   at least one magnetic flux sensor positioned a distance away from said plurality of magnets, said magnetic flux sensor and said plurality of magnets defining a flux path therebetween; and
   a flux guide positioned in said flux path, said flux guide being a layered structure having a plurality of ferro-magnetic layers formed from a ferro-magnetic material and a plurality of non-magnetic separating layers formed from a non-magnetic material, said non-magnetic separating layers of said plurality of non-magnetic separating layers being positioned between adjacent layers of said plurality of ferro-magnetic layers, wherein each of said plurality of ferro-magnetic layers and said plurality of non-magnetic separating layers are planar and parallel with respect to other layers of said plurality of ferro-magnetic layers and said plurality of non-magnetic separating layers.

17. The position sensor of claim 1 wherein each layer of said plurality of ferro-magnetic layers and each layer of said plurality of non-magnetic separating layers is formed as a planar strip.

18. The position sensor of claim 1 wherein said non-magnetic material is polystyrene foam.

* * * * *